July 20, 1926.
J. B. KEATING
COMBINED FILTER AND WATER SEAL
Filed Oct. 9, 1922
1,593,082
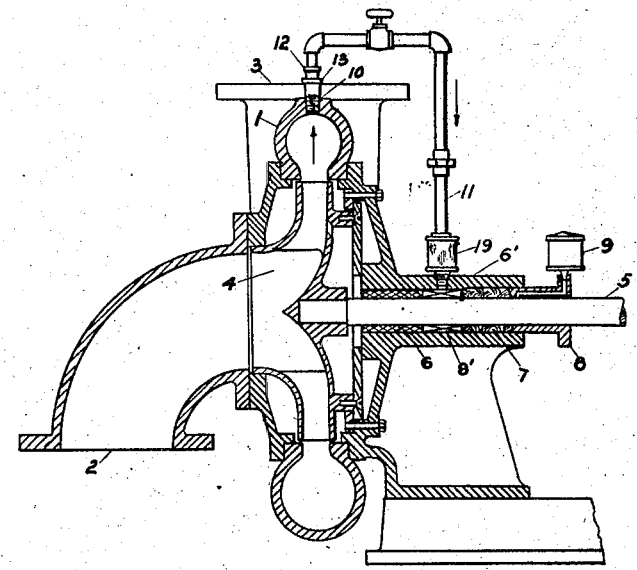
FIG. 1
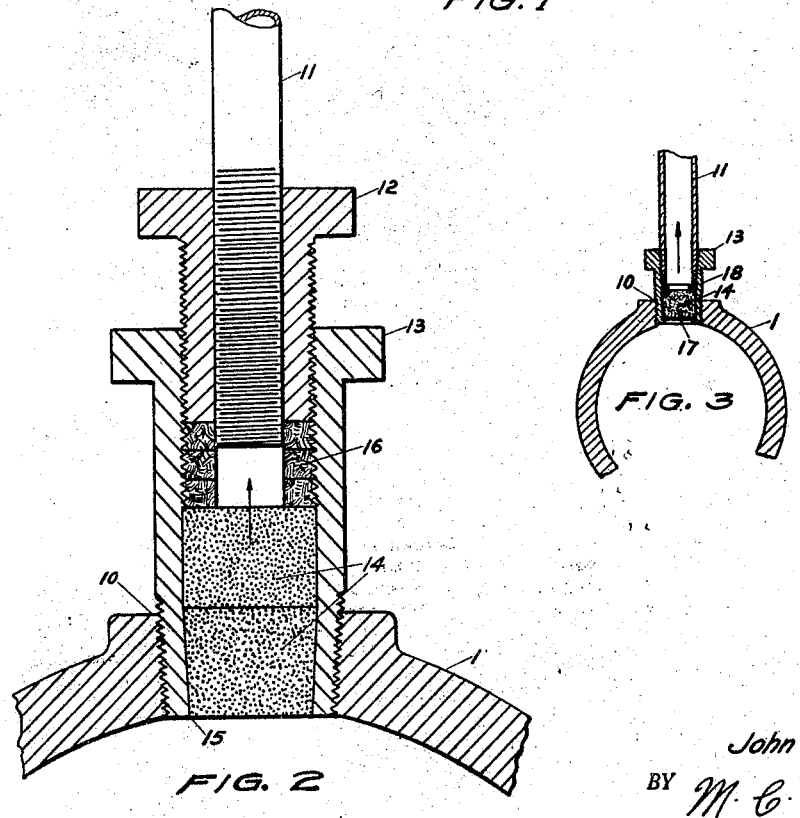
FIG. 2
FIG. 3
INVENTOR.
John B. Keating
BY M. C. Frank
ATTORNEY

UNITED STATES PATENT OFFICE.

JOHN B. KEATING, OF PIEDMONT, CALIFORNIA.

COMBINED FILTER AND WATER SEAL.

Application filed October 9, 1922. Serial No. 593,229.

This invention relates to improvements in pumps, and more especially to means for sealing, lubricating and cooling the bearings, and packing or stuffing-boxes of centrifugal pumps with filtered water.

Previous to the introduction of filtered water by my means, ordinary water such as the pump delivered, was used to serve the above purposes, but the general character of the churned water as taken from the impeller region of the pump contains sufficient dirt, grit and other foreign matter so as to render trouble and wearage at the parts where the water was delivered. To overcome these objectionable features and reach the highest state of efficiency are among my prime objects.

Other objects of my invention include: means for taking water under pump pressure from the pump casing and filtering it; means for injecting the filtered water to the bearing, and packing or stuffing box; applying the filtered water thereat so that it will there be subjected to the suction of the pump, which suction will tend to draw the water along the shaft toward the impeller, cooling and lubricating all the parts contiguous to the shaft and preventing the leakage of air around the same; means for keeping the filtering medium clean at its entering surface; and visible means for showing an observer as to whether or not the filter and water seal is functioning properly.

With the above and other objects in view, my invention consists in certain novel features of construction, form and arrangements of parts. The accompanying sheet of drawings, forming a part of this specification, illustrates an embodiment of my invention, and what I claim as new, is particularly pointed out in the appended claims following this specification.

Referring to the drawings: Figure 1 illustrates a portion of a horizontal centrifugal pump with my invention applied thereto, and is a partial axial-section, showing the pump-casing, the suction elbow, the impeller and contiguous parts, the shaft and its bearing and packing arrangement, and the means for conveying water thereto.

Figure 2 is an enlarged fragmentary cross-section of the casing and filtering end of my invention.

Figure 3 is a reduced but similar section to Figure 2, and shows a modified form of filtering means.

In the drawings: The numeral 1 represents the pump casing, 2 the pump suction, and 3 the discharge. 4 is the impeller, secured to its shaft 5, and rotated thereby. 6 is one of the bearings of the shaft and is adjacent to the pump. 7 is a packing around the shaft at the outer end of the bearing, and 8 the gland for compressing the said packing to position and against the cage ring 8'. The latter serves as a chamber for receiving and distributing the filtered water. 9 is the customary lubricating cup.

Connected to the convolution of the casing, as at 10, is a pipe 11 extending to the shaft housing 6'. At its casing end, this pipe is provided, preferably, with an adjusting fitting 12, which latter engages an additional fitting 13 screwed into the casing.

The fitting 13 is the holder for the filtering medium 14, which latter may be of any suitable material. I have found an artificial partially fused silicate to be a satisfactory material.

The filter 14 may be in sections and cemented to the holder 13, or may be loose and shaped to be supported by the slightly conical end 15, the packing 16 being compressed on the filter by the adjusting fitting 12.

In some cases, I may wish to dispense with the fitting 12 as shown in Figure 3. Here, I support the filter between a screen or perforated closure 17 and a packing ring 18, accomplished by the pipe 11 compressing the members to position.

In either case, the filter thus constituted, is placed within close proximity of the inner periphery of the pump casing, to subject its face to the scouring action of the swirling water in the pump casing, and is thus kept constantly clean.

At a suitable point in the pipe 11, if desired, I introduce a sight glass or cup 19, by an inspection of which, an observer can see whether the water is passing through pipe 11 and if such water is clear and free of all foreign matter.

The end of pipe 11 remote from the point 10 connects to the shaft housing 6' and delivers the filtered water thereto, and which water enters the cage ring 8' and passes therethrough and along the shaft, cooling and lubricating the shaft and contiguous parts, and preventing air from entering the pump along the said shaft.

While I have shown and described my invention as applied to a pump having but one convolution and a bearing adjacent thereto, it is equally applicable to pumps having many convolutions and bearings positioned differently, or to other objects where it may be used to advantage.

I claim:

1. A centrifugal pump casing having an opening in its peripheral wall, a fitting inserted in the opening and terminating flush with the interior side of said wall, a filtering material secured in said fitting having one side substantially flush with the inner end of the fitting whereby the said face of the filtering material will be subject to the scouring action of the swirling water passing through the said pump casing.

2. A centrifugal pump casing having an opening in its peripheral wall, a fitting inserted in the opening and terminating flush with the interior side of said wall, said fitting having a threaded and reduced end adapted to be received in said opening in the casing, a filtering material secured in said fitting having one side substantially flush with the inner end of the fitting whereby the said face of the filtering material will be subject to the scouring action of the swirling water passing through the said pump casing.

In testimony whereof I affix my signature.

JOHN B. KEATING.